Nov. 29, 1960   R. McGEE   2,961,725
FASTENING DEVICE
Filed April 16, 1959   2 Sheets-Sheet 1
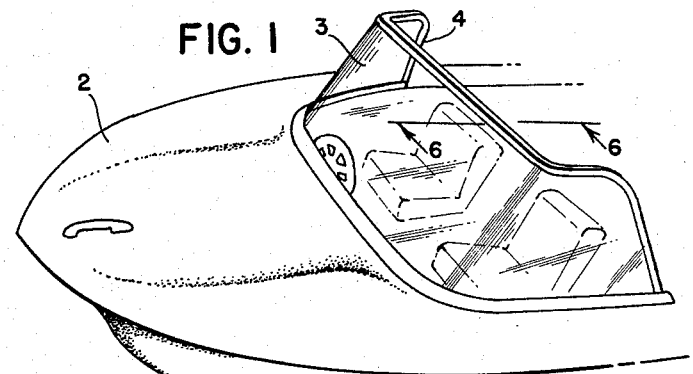
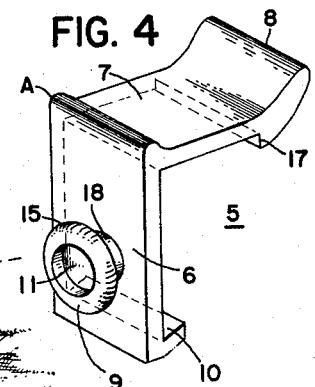
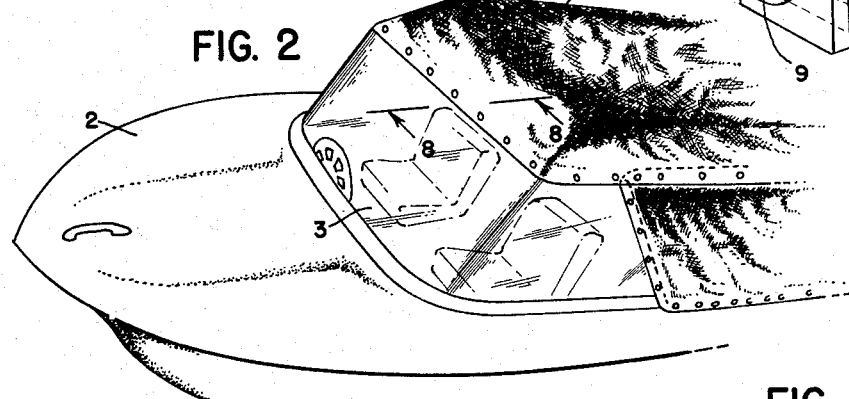
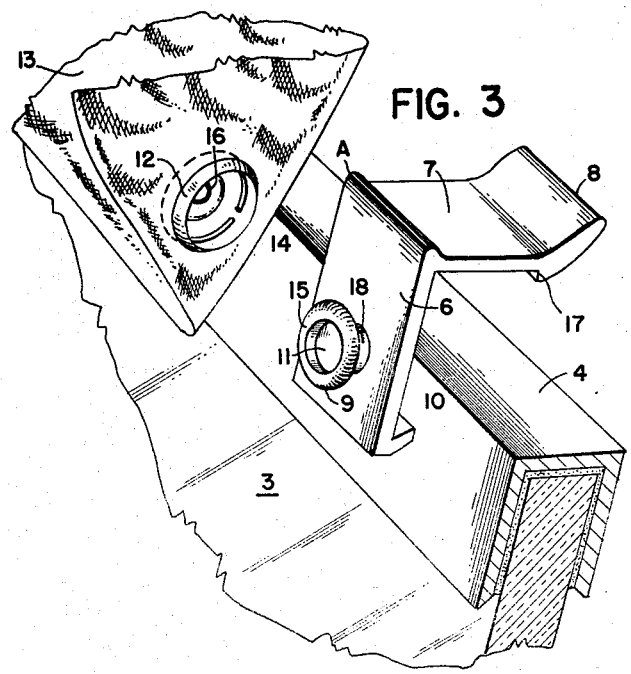
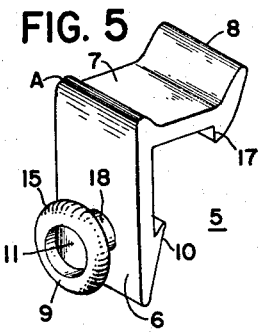
INVENTOR
RICHARD McGEE
BY Mark W. Gehan
ATTORNEY Nov. 29, 1960 R. McGEE 2,961,725
FASTENING DEVICE
Filed April 16, 1959 2 Sheets-Sheet 2
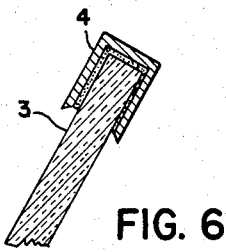
FIG. 6
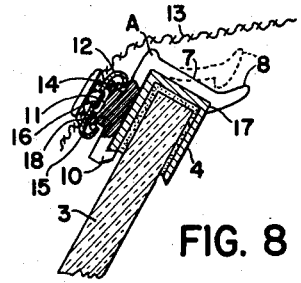
FIG. 8
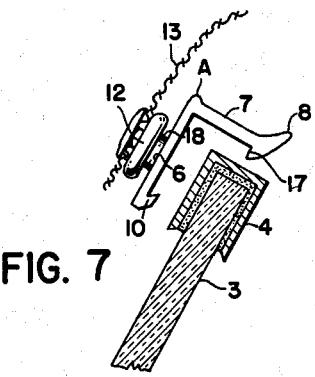
FIG. 7
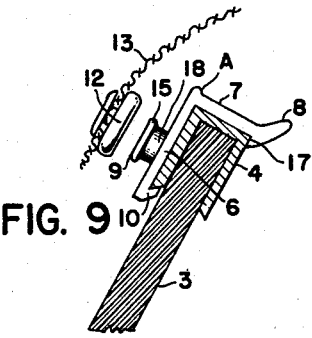
FIG. 9
FIG. 10
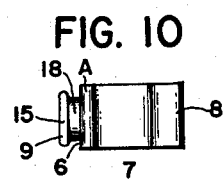
FIG. 11
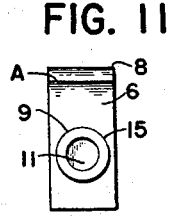
FIG. 12
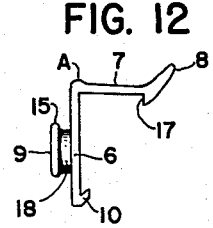
INVENTOR
RICHARD McGEE
BY Mark W. Gehan
ATTORNEY

United States Patent Office

2,961,725
Patented Nov. 29, 1960

2,961,725

FASTENING DEVICE

Richard McGee, 2016 Herschel, St. Paul, Minn.

Filed Apr. 16, 1959, Ser. No. 806,837

1 Claim. (Cl. 24—73)

This invention relates to fastening devices. More particularly, it relates to a clip type of fastening device, and has particular utility in attaching canopies, or fabric coverings, to objects or vehicles which are to be protected from wear or from the weather, etc. One particular application for my fastening device is found in attaching protective coverings over the open area (e.g., the cockpit) in a motorboat or launch.

As is well known, many boats today are made with a supporting structure, including a windshield, over which a cover may be affixed so that the boat can be converted to have an enclosed seating area, thus protecting the passengers from weather and giving a greater degree of privacy. My fastening device is useful in attaching such covers (which are usually canvas or other fabric) to boats. My clip type fastener is also useful in enclosing open areas of the boat to prevent rain, etc. from accumulating therein when the boat is not in use.

A number of fastening devices have previously been designed for attaching covers to boats. Many of these devices, however, required that the frame around the windshield be fitted with permanently attached elements (e.g., male snap members) which required special installation, at considerable expense, and which, also, gave a somewhat unsightly appearance to the windshield on the boat. Furthermore, such permanently attached snap elements, of course, were spaced apart at a fixed distance, and did not permit easy adjustment of the top along the length of the windshield, or windshield frame. Thus, if the top (most frequently made of canvas, or other material which is subject to shrinkage or stretching) were to change, dimensionally, it became difficult to affix the female portion of the snap fastener over the permanently spaced apart elements attached to the windshield.

In recent times, attempts have been made to overcome the difficulties above referred to, and certain clips, designed to snap over the windshield frame, without permanent affixation thereto, have been devised. However, these clips are permanently attached to the canvas covering and may require special machinery for such attachment. Also, if they are broken or torn loose from the canvas top in use, it is necessary to return the top to the manufacturer, or to someone else specially set up for reattaching the clips to the top in order to have the top repaired. Furthermore, in many cases the clips above referred to could be used only on a specially configured windshield frame (or molding strip) which, of course, limited their usage and utility.

It is an object of the present invention to provide a fastening device which need not and is not permanently attached to the windshield of the boat or such like, thus obviating the unsightly condition above referred to and the difficulties arising from shrinkage or stretching of the cover. It is a further object of the invention to provide a clip which may be used with standard canvas boat covers having a standard female snap element fastened into them. It is a still further object of the invention to provide a clip which may be snapped over any standard windshield frame and remain securely attached thereto. One particular advantage of the present invention is that the clip may be left attached to the convas, or, if desired, may be left affixed to the windshield frame. The present fastening device is detachable from both the windshield frame and the canvas cover. Spare clips may be kept on hand so that if one is lost a new one may be substituted, and there is no problem arising because of the need for special attachment of the clip to the canvas.

The clips of the present invention are inexpensive to manufacture. They may be formed from metal or may be molded in standard injection molding equipment from plastic material, e.g. nylon.

Referring now to the drawings:

Figure 1 is a partial perspective view of a boat having a kind of windshield upon which the clip of this invention may be used.

Figure 2 is a view of the boat of Figure 1 with a canvas top and side curtain mounted upon it with the clip of this invention.

Figure 3 is an exploded view of a windshield section, the clip, and a segment of the canvas top, with the female snap element in it.

Figure 4 is a perspective view of one embodiment of the clip of this invention.

Figure 5 is a perspective view of a modified form of clip.

Figure 6 is a cross-sectional view taken along line 6—6 of Figure 1.

Figure 7 is a cross-sectional view of a windshield, and a side view of the clip of Figure 4 about to be snapped over the windshield frame.

Figure 8 is a cross-sectional view taken along line 8—8 of Figure 2.

Figure 9 is a cross-sectional view of the windshield, with the clip of Figure 4 upon it, but with the canvas top snapped free from the clip.

Figure 10 is a plan view of the clip of Figure 4.

Figure 11 is an elevational view of that clip.

Figure 12 is a side view of the clip of Figure 4.

Referring now to the drawings in greater detail, reference character 2 designates a boat, having mounted upon it windshield 3, fitted with windshield frame 4. Frame 4, as shown more particularly in Figure 6, for example, is a channeled piece, most frequently made of aluminum. Molding 4 serves, in some instances, to maintain the configuration of windshield 3, and imparts greater strength to it. It also improves the appearance of the windshield.

Two different embodiments of my clip are shown in Figures 4 and 5. These two embodiments differ only in shape, and are designed for use with different style windshield frames 4. The form of clip shown in Figure 4 has somewhat longer top and front straps, so that it may be clipped over a larger frame. Essentially, however, the two clips shown are of the same construction.

The clips of Figures 4 and 5 are designated generally by reference character 5. As hereinabove indicated, I prefer that these clips be made from plastic material, such as nylon. However, there are other plastic materials which will function effectively. The clip comprises a front strap 6, top strap 7, and release tab 8. Front strap 6 is formed integrally with button 9. Hook element 10, also integral with the clip, is formed upon the inwardly facing face of front strap 6. The face of button 9 is formed with depression 11 so that female snap element 12, on canvas top 13, may go far enough over button 9 to permit spring element 14, in snap 12, to pass over rim 15 of button 9 and snap about the neck of said button. If depression 11 were not provided, and if instead button 9 were solid, rivet 16 (see Figure 3), by means of which female snap 12 is affixed to the canvas, would prevent said female snap from going far enough onto button 9 to permit spring 14 to snap over rim 15. Female snap element 12 is of standard type. When female snap 12 is pushed over button 9, the spring 14 in snap 12 expands, passes over rim 15 of said button, and then contracts, about neck 18 of said button, to hold the male and female members in snapped-together relationship.

As shown in Figure 3, most particularly, the clip of this invention may be separated from the top 13 and left on the windshield frame 4, or if desired, the clip can be left attached to female snap element 12 when the top 13 is removed.

When the clip is mounted on the windshield frame, hook 10, which projects upwardly at an angle, fits under the lower beveled edge of frame 4 and is retained thereby. Front strap 6 lies against the front face of windshield frame 4, and top strap 7 lies across the top surface thereof, with heel 17, formed integrally on the lower face of top strap 7, extending down a short distance along the back face of frame 4. The angle formed by top strap 7 and front strap 6 is somewhat less than 90° and preferably not more than 85°, so that said strap members will naturally tend to bear against the above-mentioned faces of frame 4, and so that the clip, by its natural tension, will tend to remain securely on the frame with hook 10 and heel 17 in position. Corner portion A of clip 5 is of thickened cross-section so that (as shown in Figure 8) when the clip is to be removed from frame 4, by upward pressure on release tab 8 (note dotted lines in Figure 8) the clip will tend to bend across top strap 7, for easy release. The thickened portion A, of course, also provides reinforcement in the clip at the place where greatest stress will occur.

As will be noted, again from Figure 8 particularly, the canvas of the top covering 13, when the cover is in position on the boat, tends to be drawn rather tightly back over windshield frame 4, as that canvas extends backwardly over the boat. One feature of particular convenience in my clip is the fact that release tab 8 is spaced away from (below) the inside of the windshield frame, in a position where it may readily be pushed up and off by someone desiring to remove the canvas cover from the inside of the boat.

Because of the fact that my clip may be detached from the canvas cover (and either left on the windshield frame or removed therefrom and put in some container), the cover need not be handled as carefully as is necessary in those instances where the clip is permanently affixed to it. In the case where the clip is integral with the canvas, care must be exercised when handling the cover so that the clip does not become torn loose therefrom when the cover is being handled.

The fact that my clip covers two faces (i.e., the front face and the top face) of the windshield frame renders it more suitable for use on frames which have been slightly deformed (as frequently happens) during the manufacturing operation. Furthermore, the feature just referred to permits the clip to be molded so that the two straps thereof form an angle of less than 90° (see Figure 10), and places the release tab 8 in position where it may easily be reached.

Having described my invention, what I claim is:

A resilient clip type fastening device for attaching a protective or decorative flexible cover over the open area of a boat by affixation of said cover to a boat windshield frame having a front face, a parallel, spaced-apart back face, and a top face extending at a right angle to said first named faces and connecting the same, said clip being freely detachable from and reattachable to both said cover and said frame and comprising a front strap and a top strap formed to define an angle of somewhat less than 90° each of said front strap and said top strap being of length sufficient to completely span, respectively, said front face and said top face, said clip being generally L-shaped, the under surface of said top strap, at a distance from said front strap which is substantially equal to the width of said top face, being formed with a downwardly extending heel adapted to lie slidably against said back face, said heel being substantially coextensive in length with the width of said top strap, the free tip of said top strap being formed with a release tab projecting upwardly from said top strap and rearwardly away from said heel, said top strap being adapted to bend resiliently upon thumb pressure applied to said release tab, the free top of said front strap being formed with an inwardly facing hook adapted to underlie the lower edge of said front face, said hook projecting upwardly to form an angle of substantially less than 90° in relation to said front strap, the outer surface of said front strap being formed with a button adapted to hold a female snap member, said clip being attachable to said frame without piercing any surface thereof.

References Cited in the file of this patent

UNITED STATES PATENTS

| | | |
|---|---|---|
| 756,764 | Wright | Apr. 5, 1904 |
| 2,003,856 | Gimbel | June 4, 1955 |